(12) United States Patent
Chang et al.

(10) Patent No.: US 7,050,553 B2
(45) Date of Patent: May 23, 2006

(54) COMMUNICATION DEVICE THAT PROVIDES ENHANCED SERVICES

(75) Inventors: Shye-Bin S. Chang, Naperville, IL (US); Richard Warren Hemmeter, Naperville, IL (US); Stinson Samuel Mathai, Wheaton, IL (US); Hong Xie, Downers Grove, IL (US)

(73) Assignee: Lucent Technologies Inc., Murry Hill, NJ (US)

( * ) Notice: Subject to any disclaimer, the term of this patent is extended or adjusted under 35 U.S.C. 154(b) by 133 days.

(21) Appl. No.: 10/717,889

(22) Filed: Nov. 20, 2003

(65) Prior Publication Data

US 2005/0111638 A1    May 26, 2005

(51) Int. Cl.
*H04M 11/00* (2006.01)

(52) U.S. Cl. ................ 379/93.15; 379/93.23; 379/90.01; 379/93.05

(58) Field of Classification Search ........... 379/93.15, 379/110.01, 90.01, 93.05, 93.06, 93.08, 93.17, 379/93.23; 370/352
See application file for complete search history.

(56) References Cited

U.S. PATENT DOCUMENTS

| 4,882,681 | A | 11/1989 | Brotz |
| 6,138,096 | A | 10/2000 | Chan et al. |
| 6,345,047 | B1 * | 2/2002 | Regnier ............... 370/352 |
| 6,490,550 | B1 * | 12/2002 | Hiri ..................... 704/201 |

FOREIGN PATENT DOCUMENTS

| EP | 074051 A | 10/1996 |
| WO | 01/17219 A1 | 3/2001 |

* cited by examiner

*Primary Examiner*—Melur Ramakrishnaiah

(57) ABSTRACT

A communication device is described that includes a POTS interface system, a processing system, a conversion system, a voice interface system, and a digital interface system. When in operation, the POTS interface system receives analog voice signals for a call. The POTS interface system converts the analog voice signals from analog to digital to generate digital voice signals. The processing system performs an application on the digital voice signals to provide a presentation format of the digital voice signals of the call to a user. The conversion system then converts the digital voice signals into analog voice signals and a voice interface system transmits audible signals to the user. The digital interface system receives digital data signals from a data service provider and the processing system performs an application on the digital data signals to provide additional data to the user.

20 Claims, 6 Drawing Sheets

COMMUNICATION DEVICE THAT PROVIDES ENHANCED SERVICES

BACKGROUND OF THE INVENTION

1. Field of the Invention

The invention is related to the field of communication systems, and in particular, to communication devices and methods of operating communication devices that provide enhanced services to users.

2. Statement of the Problem

Almost every house, apartment, condo, etc. is wired for phone service, commonly called POTS service. On a daily basis, people use the POTS service to place calls for business and personal use. The wiring for POTS service is typically a twisted-pair copper wire that connects the home to a central office of the local telephone company. The connection between the central office and the home over the twisted-pair wire is sometimes referred to as the "last mile". For POTS service, a phone takes acoustic signals and converts them into analog signals that are the electrical equivalent of the acoustic signals in terms of volume and pitch. The phone then transmits analog signals to the central office.

The central office applies a low voltage to the twisted-pair wire using a power supply or battery. The voltage on the wire provides power to phones in the home. Because the central office provides power to the twisted-pair wire, phones in the home work even if the commercial electric power goes out in the home.

Recently, Internet access and email have become a daily routine. Many people access the Internet and their email accounts from a home computer using POTS service. Because the central office expects an analog signal, the home computer uses a modem to modulate digital data from the computer into analog signals. The modem then transmits the analog signals over the twisted-pair wire to the central office.

The analog transmission between the home computer and the central office only uses a portion of the twisted-pair wire potential bandwidth for transmission, which limits the bandwidth available to the home computer. Also, if the central office receives digital data destined for the home computer, the central office has to convert the digital data to analog signals and transmit the analog signals over the twisted-pair wire. The modem of the home computer then converts the analog signals back to the digital data. The conversion back and forth between digital and analog may limit the available bandwidth to about 56 Kbps. Consequently, the POTS service may not provide a desired bandwidth for accessing the Internet, sending emails, or other applications.

To receive higher bandwidths over the existing twisted-pair wire, communication providers have implemented services such as Digital Subscriber Line (DSL) service. DSL service provides voice service and data service simultaneously over the twisted-pair wire. Depending on the distance and twisted-pair circuit quality, a user subscribing to the DSL service can advantageously receive a bandwidth around 1.544 Gbits/s for accessing the Internet while still retaining traditional POTS service.

For DSL service, a DSL modem transmits digital signals at a high frequency over the twisted-pair wire simultaneously as analog signals travel over the twisted-pair wire at a low frequency. The analog signals comprise traditional POTS service generally used for voice calls. The digital signals are generally used for data services, such as accessing the Internet or sending email, but may also be used for voice calls, such as Voice over Internet Protocol (VoIP) calls.

For the data services, a computer connects to an Internet Service Provider (ISP) through the DSL modem. Once connected to the ISP, the computer may receive digital signals directly from the ISP. The computer can receive the digital signals at a higher bandwidth than if the central office had to convert the digital signals to an analog signal.

Unlike the POTS service, the central office does not provide power to the DSL modem or the computer. The computer needs an independent power supply to operate. If the power is interrupted to the computer, the computer is not able to operate.

Another way to receive higher bandwidths is to subscribe to cable service. Cable service utilizes a coaxial cable for the cable service for high bandwidth data services. The user maintains POTS service separately over the twisted-pair wire. With cable service, the user can simultaneously use the POTS service for voice calls and use the cable service for accessing the Internet or sending email.

Although current computers can receive DSL service to make calls and surf the Internet, the features provided to the user for communications is limited. The voice features offered to the user are limited to the features normally provided by the POTS service (and the phone company). The features include voice mail, call waiting, and caller ID. The data services provided by DSL service are not currently used to add features to the POTS service. The POTS service (voice service) is typically used for phones and the DSL service (data service) is typically used for Internet and email. The POTS service is not used to enhance the data service and the data service is not used to enhance POTS service. Therefore, the features available to a user are limited, and a user may desire other features that are not currently available.

Also, computers set up for DSL service require power to operate. If the power is interrupted to the computer, then the computer can no longer communicate voice or data. This may be unfortunate in the event of brown outs, power surges, terrorist acts, storms, etc.

SUMMARY OF THE SOLUTION

The invention solves the above problems and other problems with a communication device and a method of operating a communication device in exemplary embodiments described herein. One exemplary embodiment is a communication device that operates as follows to provide enhanced services to a user. For voice services, a POTS interface system in the communication device receives analog voice signals for a call from a POTS provider over a wireline. The POTS interface system converts the analog voice signals from analog format to digital format to generate digital voice signals, and forwards the digital voice signals to a processing system. Responsive to the digital voice signals, the processing system performs an application on the digital voice signals to provide one or more presentation formats of the digital voice signals of the call to a user. Some presentation formats of the digital voice signals may include: displaying text of the call, storing the text, printing the text, etc. The processing system forwards the digital voice signals to a conversion system to complete the call to the user. The conversion system converts the digital voice signals into analog voice signals, and forwards the analog voice signals to a voice interface system. The voice interface system transmits audible signals to the user representing the analog voice signals.

For data services, a digital signal interface in the communication device receives digital data signals from a data service provider. The digital signal interface forwards the digital data signals to the processing system. Responsive to the digital data signals, the processing system performs an application on the digital data signals to provide additional data to the user. Some examples of providing additional data include: displaying a telephone directory, displaying text messages, displaying a web page, displaying more caller ID information, etc.

The communication device advantageously provides enhanced communications to the user by providing more features to the user with a single communication device. There is currently no terminal device that integrates voice service and data services to provide enhanced communications as the communication device herein. With the communication device, a user may make a voice call over a POTS connection while surfing the Internet, using only one device.

One way the communication device provides more features to the user is by digitizing the analog voice signals from the POTS provider. By digitizing the analog voice signals, the communication device may provide the call in any presentation format available for digital signals. For instance, communication device may generate text from the digital voice signals of the call and display the text to the user. The user can then read what was said in a conversation as the text of the conversation is displayed to the user. The user may also store part or all of the text of the conversation in a soft copy for future reference or print the text of the conversation in a hard copy.

The communication device may also perform any function for the call that can be performed on digital signals. For instance, the communication device may format the digital voice signals for wireless transmission of the digital voice signals to remote wireless devices.

In another exemplary embodiment, the communication device further includes a power supply system, a power detection system, and POTS circuitry. The power supply system provides power to the communication device. The power detection system detects an interrupt in the power provided by the power supply system. The POTS circuitry is coupled between the wireline and the POTS interface system, and the wireline and the voice interface system. The POTS circuitry receives analog voice signals from the wireline. The POTS circuitry forwards the analog voice signals to the POTS interface system responsive to the power detection system not detecting an interrupt in power to the communication device. If the POTS circuitry does detect an interrupt in power, then the POTS circuitry forwards the analog voice signals to the voice interface system.

The communication device in this embodiment is more reliable because it can operate when the power is interrupted. If the power to the communication device is interrupted, the communication device advantageously reverts back to regular POTS service. The POTS circuitry is powered by the voltage put on the wireline by the central office and not by the power supply system. Therefore, the user may still make voice calls with the communication device when the power is interrupted.

The invention may include other embodiments described below.

DESCRIPTION OF THE DRAWINGS

The same reference number represents the same element on all drawings.

DETAILED DESCRIPTION OF THE INVENTION

Figure 1:
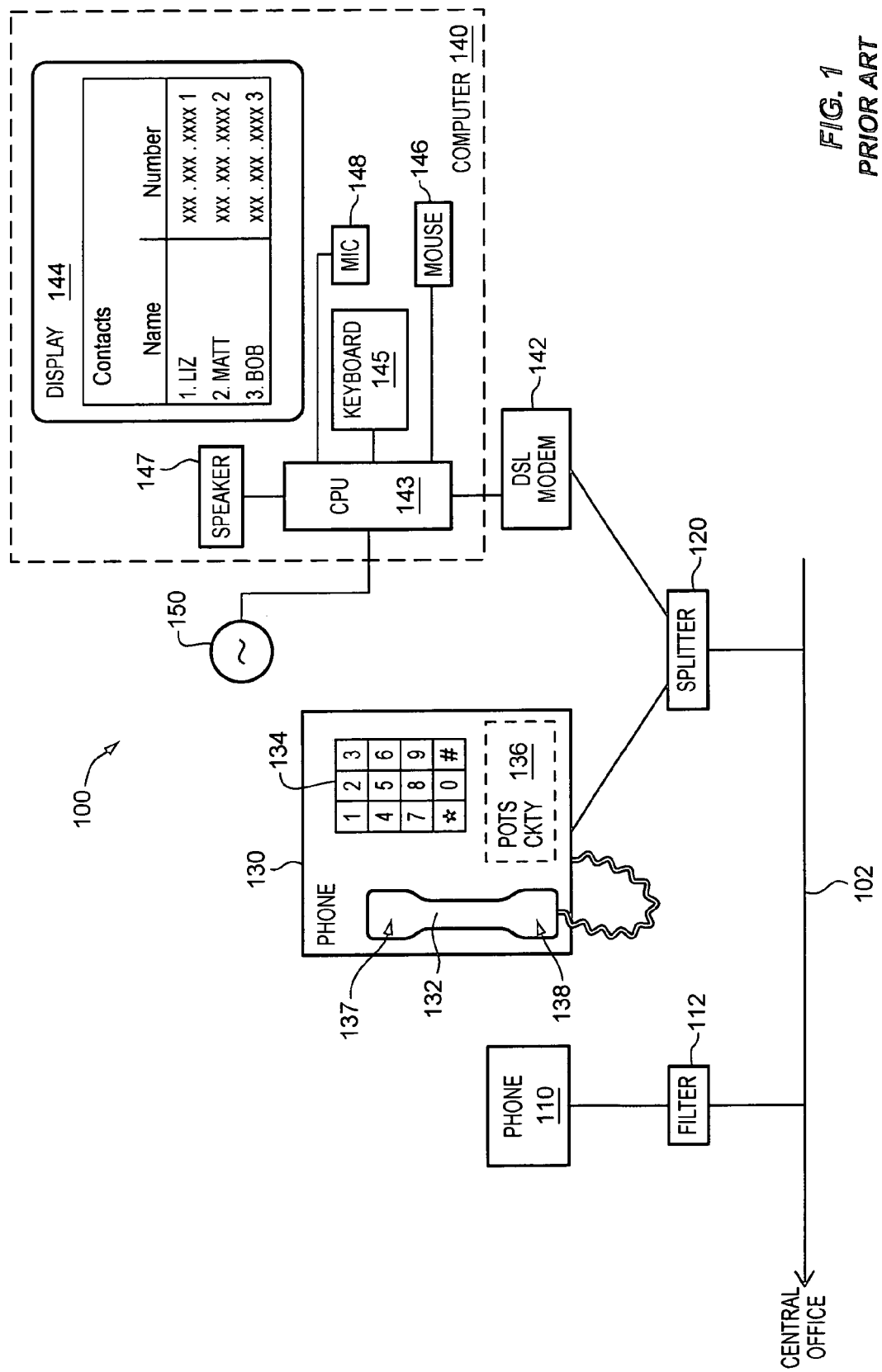
FIG. 1 illustrates a customer premises in the prior art.

Prior Art Customer Premises—FIG. 1

FIG. 1 illustrates a customer premises 100 in the prior art to help better understand the invention. Examples of customer premises 100 include a house, an apartment, and a condo. Customer premises 100 includes a phone line 102, such as a twisted-pair copper wire installed in many homes. The other end of phone line 102 connects to a central office (not shown) of a local phone company. Assume that a user in customer premises 100 has subscribed to Digital Subscriber Line (DSL) service over phone line 102. The DSL service provides for the transfer of DSL signals over phone line 102. The central office may include a Digital Subscriber Line Access Multiplexer (DSLAM) for the DSL service. Customer premises 100 also includes a phone 110, a phone 130, and a computer 140 coupled to phone line 102.

Phone 110 connects to phone line 102 through a DSL filter 112. Phone 110 is a conventional POTS phone.

Phone 130 connects to phone line 102 through a DSL splitter 120. Phone 130 is also a conventional POTS phone. Phone 130 includes a handset 132, a keypad 134, and POTS circuitry 136. Handset 132 includes a speaker 137 and a microphone 138. POTS circuitry 136 comprises conventional circuitry used in phones for POTS service.

Computer 140 connects to phone line 102 through DSL splitter 120 and a DSL modem 142. Computer 140 includes a Central Processing Unit (CPU) 143, a display 144, a keyboard 145, a mouse 146, a speaker 147, and a microphone 148. Computer 140 also includes a power supply (not shown) coupled to a power source 150 to provide power to computer 140.

For DSL service, phone line 102 transports DSL signals. The DSL signals include digital signals at a high frequency and analog signals at a low frequency. The analog signals comprise traditional POTS service generally used for voice calls. The digital signals are generally used for data services, such as accessing the Internet or sending email.

By connecting to phone line 102, phone 110 receives POTS service. DSL filter 112 filters out frequencies other than the frequencies used for the POTS service. Phone 110 may have a humming noise if DSL filter 112 is not installed. When phone 110 is connected to phone line 102, the user may make a call over the Public Switched Telephone Network (PSTN). With the POTS service, phone 110 receives a low voltage signal from the central office that powers phone 110. Phone 110 is able to operate even if customer premises 100 loses power.

DSL splitter 120 splits the DSL signals between phone 130 and computer 140. DSL splitter 120 splits the DSL signals into analog signals and digital signals. DSL splitter 120 forwards the analog signals used for the POTS service to phone 130. The user may make a call with phone 130 over the Public Switched Telephone Network (PSTN) using the POTS service. As with phone 110, phone 130 receives a low voltage signal from the central office that powers phone 130.

DSL splitter 120 forwards the digital signals to DSL modem 142. The user may access data services, such as accessing the Internet or sending email, with computer 140. The DSL service may provide a desired bandwidth for accessing the Internet or sending emails. Computer 140 does not receive the voltage signal from the central office as is done with traditional POTS service. Computer 140 requires an independent power supply to operate.

To access the data services, computer 140 connects to an Internet Service Provider (ISP) through DSL modem 142. Once connected to the ISP, computer 140 may receive digital signals directly from the ISP. The ISP connects computer 140 to the Internet to allow a user to view web sites, download data, check email, etc. The user browses the Internet using a web browser running on CPU 143. The user uses keyboard 145 and mouse 146 to request web sites that the web browser displays on display 144.

Computer 140 may also be used for voice calls. To make such voice calls, the user also has to subscribe to a Voice over Internet Protocol (VoIP) service. To make calls using the VoIP service, the user again connects to an ISP with computer 140. VoIP software running on CPU 143 allows the user to enter a phone number. The VoIP software connects with a VoIP server through the ISP. The VoIP server locates a terminating node for the phone number and establishes an IP address for the terminating point for the call. The VoIP server transmits the IP address to the VoIP software running on computer 143. With the call set up, the user may then talk into microphone 148. The VoIP software converts the user's voice captured by microphone 148 into digital signals. The VoIP software then transmits the digital signals over phone line 102 at the high frequency of the DSL service. The VoIP software transmits the digital signals to the terminating point based on the IP address of the terminating point. The digital signals travel over the Internet to the terminating point, instead of over the PSTN like POTS calls. Computer 140 may be called a "soft phone" when providing the VoIP service as described above.

To facilitate placing calls, CPU 143 may also run user interface software. The user interface software displays a list of contacts, the number of each contact, etc., on display 144. An example of user interface software is Microsoft Outlook. The subscriber can select one of the contacts, and consequently a dialed number, using mouse 146 or keyboard 145. The user interface software then dials the number of the selected contact. The subscriber may dial the number manually using keyboard 145.

One problem with customer premises 100 is that users of the equipment in customer premises 100 only have access to limited features. When making a call using phone 110 or 130, the only features available to the user are the normal POTS features, such as voice mail, call waiting, and caller ID. The data services provided by DSL service are not currently used to add features to the POTS service. The POTS service (voice service) is typically used for phones and the DSL service (data service) is typically used for Internet and email. The POTS service is not used to enhance the data service and the data service is not used to enhance POTS service. Therefore, the features available to a user are limited, and a user may desire other features that are not currently available.

Also, computer 140 requires power to operate. If the power is interrupted to computer 140, then computer 140 can no longer communicate voice or data. This may be unfortunate in the event of brown outs, power surges, terrorist acts, storms, etc.

Figure 2:
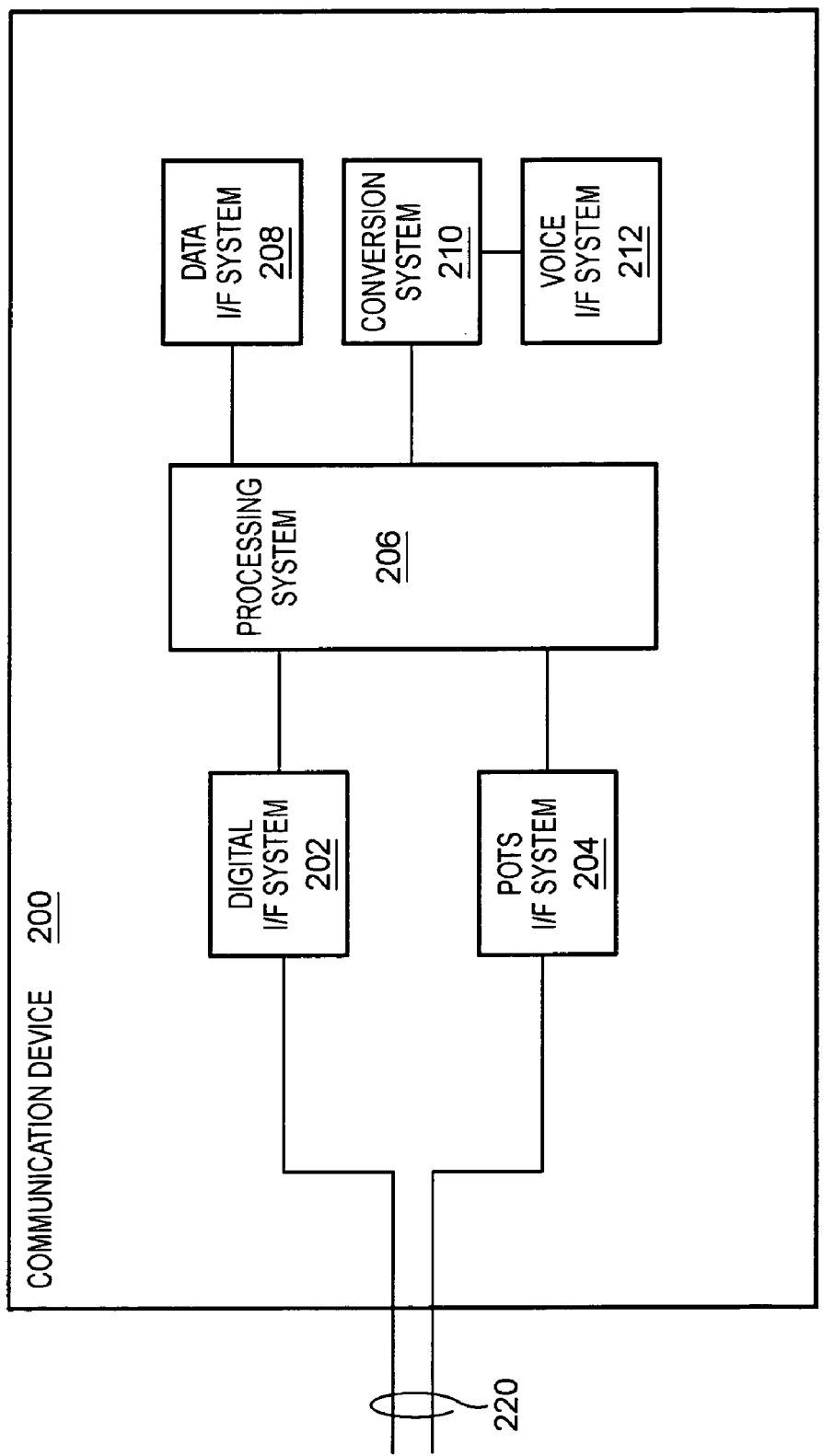
FIG. 2 illustrates a communication device in an exemplary embodiment of the invention.

Communication Device—FIG. 2

FIG. 2 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate that variations from these embodiments may fall within the scope of the invention. Those skilled in the art will appreciate that the embodiments described below can be combined in various ways to form multiple variations of the invention. As a result, the invention is not limited to the specific embodiments described below, but only by the claims and their equivalents.

FIG. 2 illustrates a communication device 200 in an exemplary embodiment of the invention. Communication device 200 includes a digital interface system 202, a Plain Old Telephone Service (POTS) interface system 204, a processing system 206, a data interface system 208, a conversion system 210, and a voice interface system 212. Communication device 200 is configured to connect to at least one wireline 220. Wireline 220 may comprise a single twisted-pair copper wire. Wireline 220 may also comprise a twisted-pair copper wire and a coaxial cable.

In this embodiment, digital interface system 202 connects to wireline 220 and processing system 206. POTS interface system 204 connects to wireline 220 and processing system 206. Processing system 206 connects to data interface system 208 and conversion system 210. Conversion system 210 connects to voice interface system 212.

In operation, communication device 200 provides voice and data services. To provide the voice service or POTS service, POTS interface system 204 connects to a POTS provider over wireline 220. The POTS provider provides POTS service to communication device 200 through analog voice signals. The POTS provider may be a local telephone company or a central office of a telephone company.

For receiving a voice call into communication device 200, POTS interface system 204 receives analog voice signals from wireline 220. POTS interface system 204 converts the analog voice signals received over wireline 220 from analog format to digital format to generate digital voice signals. POTS interface system 204 transmits the digital voice signals to processing system 206. Processing system 206 performs an application on the digital voice signals to provide one or more presentation formats of the digital voice signals of the call to a user of communication device 200. One example of a presentation format of the digital voice signals of the call includes displaying text of the call to the user. For instance, the digital voice signals of the call comprise bearer communications for the call. In this situation, processing system 206 performs the application on the digital voice signals to generate text of the digital voice signals and display the text to the user. Other presentation formats of the digital voice signals include printing or storing the text of the call. Processing system 206 may also perform another application on the digital voice signals to format the digital voice signals for wireless transmission to remote wireless devices. The wireless transmission may be for 802.11b, 802.11g, or another protocol.

To complete the voice call to the user, processing system 206 forwards the digital voice signals to conversion system 210. Conversion system 210 converts the digital voice signals into analog voice signals and forwards the analog voice signals to voice interface system 212. Conversion system 210 may include a modulator/demodulator (modem) or Digital-to-Analog (D/A) circuitry. Voice interface system 212 transmits audible signals to the user representing the analog voice signals. Voice interface system 212 may include a microphone (not shown), a speaker (not shown), and a keypad (not shown). One example of voice interface system 212 may be a handset and keypad used for conventional phones.

For transmitting a voice call out of communication device 200, voice interface system 212 receives audible signals from the user and forwards analog voice signals representing the audible signals to conversion system 210. The audible signals represent sounds spoken by the user. Conversion system 210 converts the analog voice signals into digital voice signals and forwards the digital voice signals to processing system 206. Processing system 206 performs the same or other applications on the digital voice signals to provide the presentation formats of the digital voice signals to the user. Processing system 206 forwards the digital voice signals to POTS interface system 204. POTS interface system 204 converts the digital voice signals from digital format to analog format to generate analog voice signals. POTS interface system 204 transmits the analog voice signals over wireline 220.

Simultaneous with the voice service, communication device 200 may provide data services. To provide the data services, digital interface system 202 connects to a data service provider over wireline 220. The data service provider provides the data service to communication device 200 through digital data signals. The data service provider may be an Internet Service Provider (ISP), a DSL provider, a cable television company offering Internet-based services, a server on the Internet, an email server, or another provider.

To receive data into communication device 200, digital interface system 202 receives digital data signals over wireline 220. Digital interface system 202 forwards the digital data signals to processing system 206. Processing system 206 performs an application on the digital data signals to provide additional data to the user. Processing system 206 may provide the additional data through data interface system 208. Examples of providing the additional data include: displaying a telephone directory to assist in making a call, displaying text messages, such as SMS messages, displaying a web page or other data from the Internet, displaying additional or enhanced caller ID information, etc. Data interface system 208 may include a display, monitor, screen, or other display device. Data interface system 208 may also include a keyboard, a mouse or other pointing device, a keypad, or a touch-screen.

Processing system 206 may also perform another application on the digital data signals to provide digital telephone service to the user. An example of digital telephone service is Voice over Internet Protocol (VoIP) service.

To transmit data out of communication device 200, data interface system 208 receives input from the user. The input may be from a keyboard, a mouse or other pointing device, a keypad, or a touch-screen. Data interface system 208 generates digital data signals from the input and forwards the digital data signals to processing system 206. Processing system 206 performs the same or other applications on the digital data signals to provide additional data to the user. Processing system 206 forwards the digital data signals to digital interface system 202. Digital interface system 202 transmits the digital data signals over wireline 220 to the data service provider.

Communication device 200 advantageously provides enhanced communications to the user by providing more features to the user with a single communication device. Because POTS interface system 204 digitizes the analog voice signals from the POTS provider, communication device 200 may provide different presentation formats to the user than previously available. For instance, communication device 200 may generate text from the digital voice signals and display the text to the user. The user can then read what was said in a conversation as the text of the conversation is displayed to the user. This may be useful for hearing impaired users. The user may also store part or all of the text of the conversation in a soft copy for future reference or print the text of the conversation in a hard copy. Communication device 200 may also format the digital voice signals for wireless transmission of the digital voice signals to remote wireless devices. Communication device 200 may format the digital voice signals based on 802.11b, 802.11g, or other protocols. The remote wireless devices may comprise wireless telephones or other wireless devices.

Communication device 200 also advantageously integrates voice and data services into a single device. The data services may be used to enhance voice services in communication device 200, and vice-versa. For instance, assume that communication device 200 receives a video call. For the video call, POTS interface system 204, processing system 206, conversion system 210, and voice interface system 212 may handle the voice-part of the call. In particular, processing system 206 performs an application on the digital voice signals of the call to provide voice for the call to the user. Simultaneously, digital interface system 202, processing system 206, and data interface system 208 may handle the video-part of the call. In particular, processing system 206 performs an application on the digital data signals to provide video for the call to the user. The integration of the voice and data services provides the user with enhanced communications.

Figure 3:
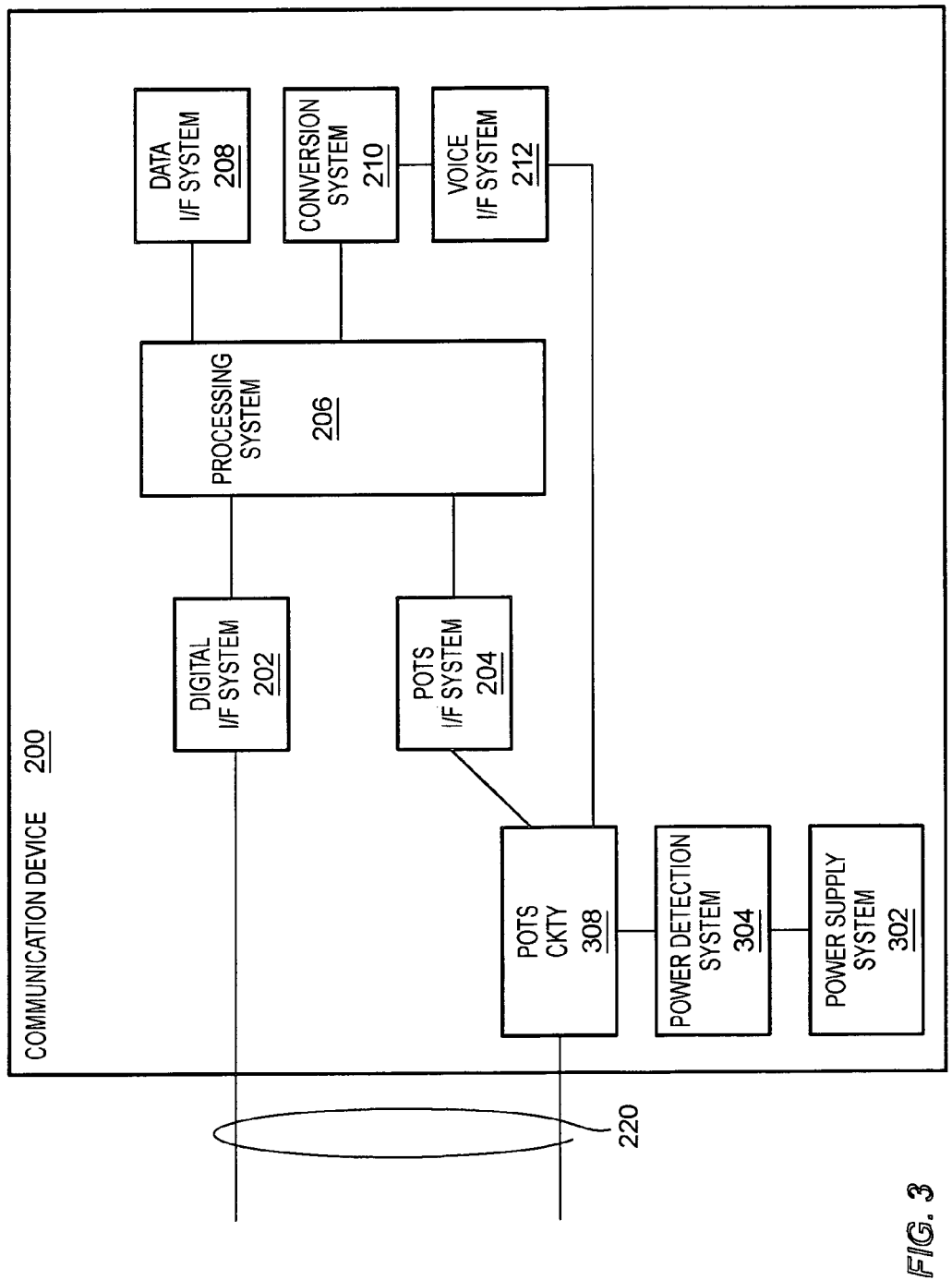
FIG. 3 illustrates a communication device in an exemplary embodiment of the invention.

Communication Device—FIG. 3

FIG. 3 and the following description depict specific exemplary embodiments of the invention to teach those skilled in the art how to make and use the invention. The invention is not limited to the specific embodiments described below, but only by the claims and their equivalents.

FIG. 3 illustrates communication device 200 in another exemplary embodiment of the invention. In this embodiment, communication device 200 also includes a power supply system 302, a power detection system 304, and POTS circuitry 308. Power supply system 302 connects to power detection system 304. Power detection system 304 connects to POTS circuitry 308. POTS circuitry connects to wireline 220, POTS interface system 204, and voice interface system 212.

Power supply system 302 comprises any system, devices, or components configured to supply power to communication device 200. Power supply system 302 may comprise a battery that provides power to communication device 200. Power supply system 302 may comprise circuitry that connects to an external power source, such as a 110 Volt AC outlet.

Communication device 200 operates substantially as described above in association with FIG. 2, except that communication device 200 in FIG. 3 has the following added functionality. Power detection system 304 detects an interrupt in the power provided by power supply system 302.

The interrupt in power may be due to a problem with power supply system 302 or a problem or outage with a commercial power source providing power to power supply system 302. The interrupt in power may be a temporary interrupt of a few seconds, or may be an extended interrupt of hours or days.

For voice calls coming into communication device 200, POTS circuitry 308 receives analog voice signals from the POTS provider (not shown) over wireline 220. POTS circuitry 308 comprises conventional POTS circuitry used for POTS service. If power is interrupted to communication device 200, then POTS circuitry 308 forwards the analog voice signals to voice interface system 212. Responsive to the analog voice signals, voice interface system 212 transmits audible signals to the user. Because POTS circuitry 308 comprises traditional POTS circuitry, POTS circuitry 308 receives a low voltage signal from the POTS provider as is traditionally done. The low voltage signal powers POTS circuitry 308 and voice interface system 212 instead of power supply system 302.

If power is not interrupted to communication device 200, then POTS circuitry 308 forwards the analog voice signals to POTS interface system 204 and communication device 200 operates substantially as described above in association with FIG. 2.

For voice calls going out of communication device 200, voice interface system 212 receives audible signals from the user. If power is interrupted to communication device 200, then voice interface system 212 forwards the analog voice signals, representing the audible signals, to POTS circuitry 308. The audible signals represent sounds spoken by the user. POTS circuitry 308 forwards the analog voice signals over wireline 220. When the power is interrupted, POTS circuitry 308 does not transmit the analog voice signals to POTS interface system 204 and POTS interface system 204 does not convert the analog voice signals from analog format to digital format.

If power is not interrupted to communication device 200, then voice interface system 212 forwards the analog voice signals to conversion system 210 and communication device 200 operates substantially as described above in association with FIG. 2.

Communication device 200 advantageously is more reliable because it can operate when the power is interrupted. If the power to communication device 200 is interrupted, then communication device 200 advantageously reverts back to regular POTS service by having POTS circuitry 308 handle the call. POTS circuitry 308 is powered by the voltage put on wireline 220 by the central office and not by power supply system 302. Therefore, the user may still make voice calls with communication device 200 when the power is interrupted.

Figure 4:
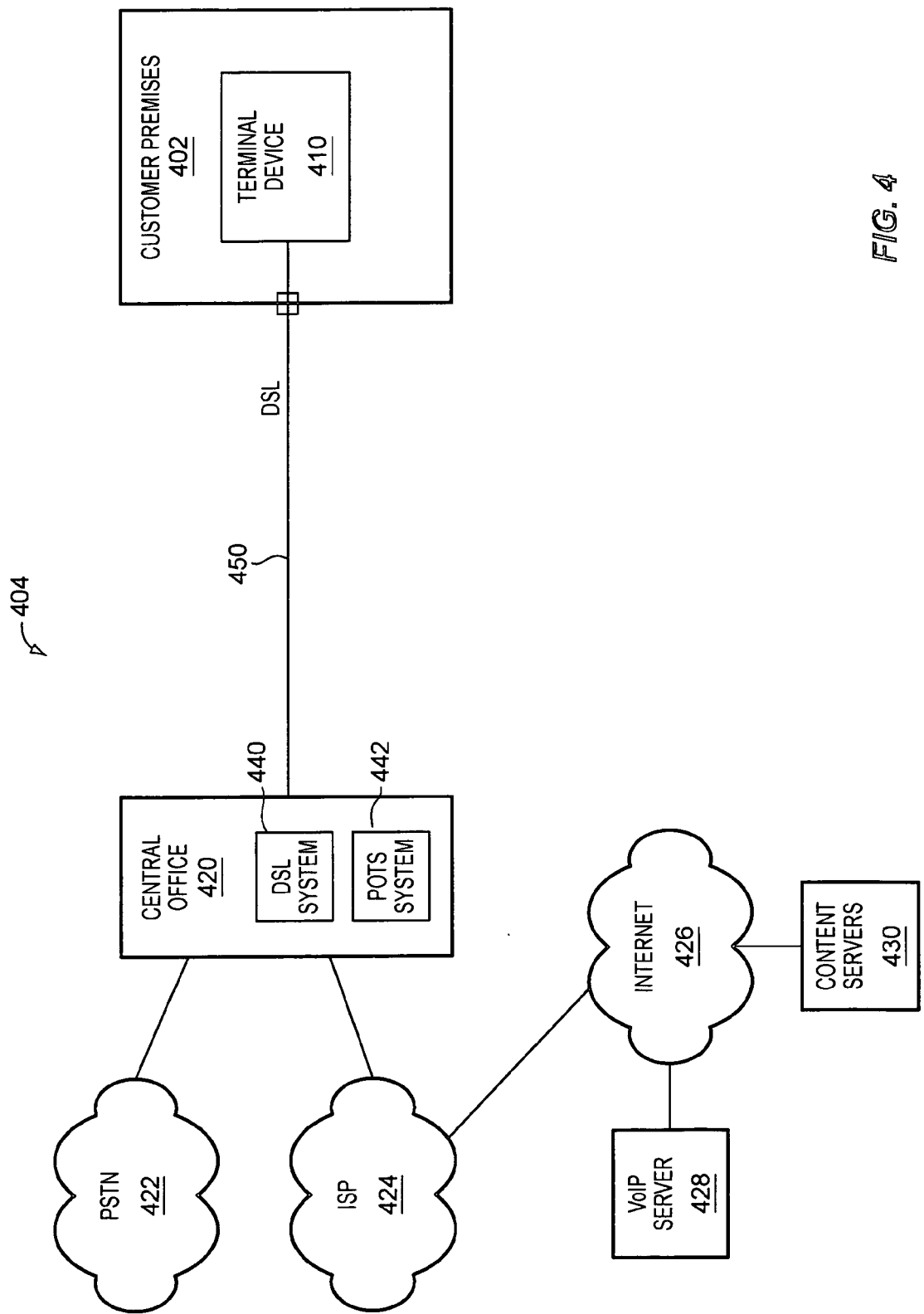
FIG. 4 illustrates a customer premises coupled to a communication network in an exemplary embodiment of the invention.
Figure 5:
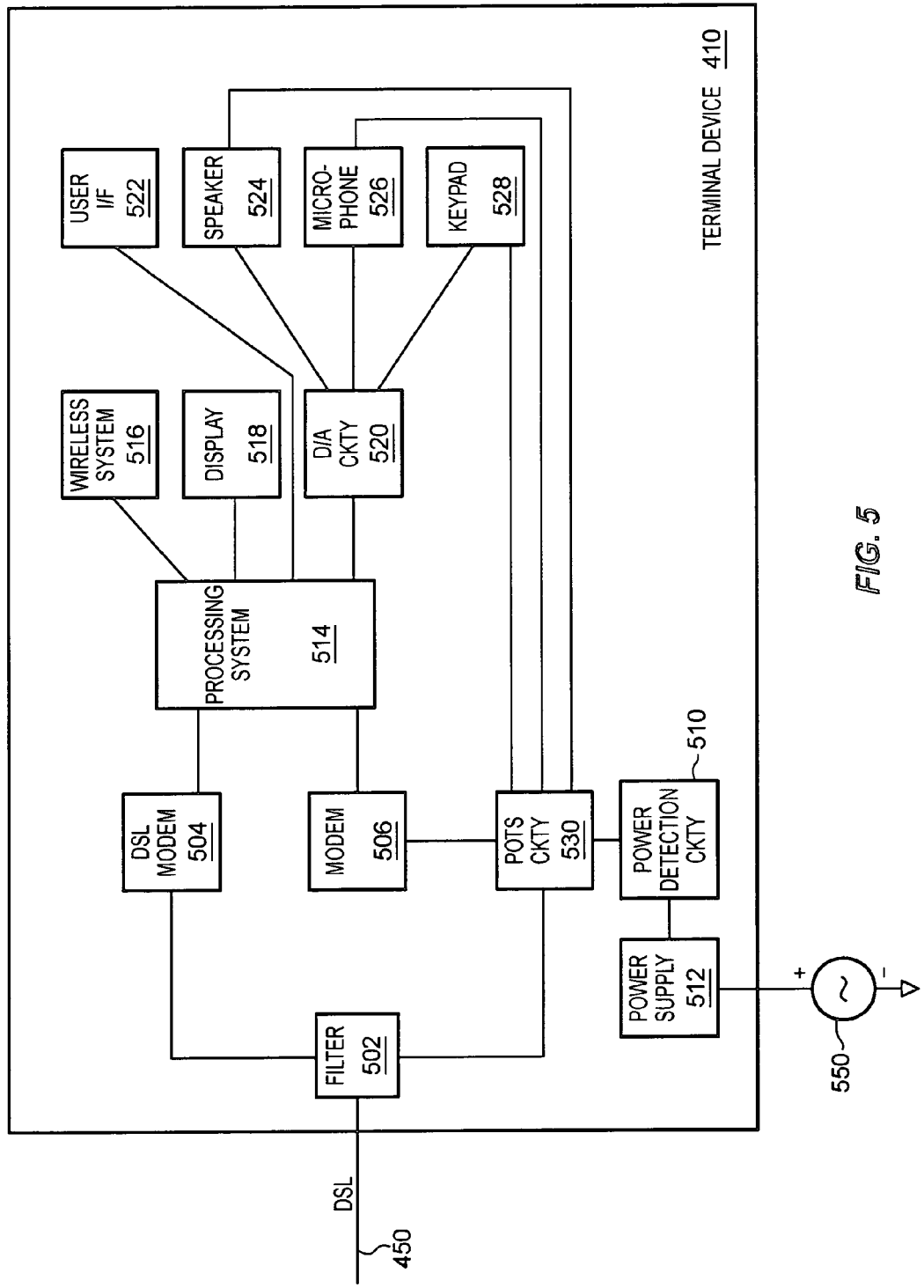
FIG. 5 illustrates the components of a terminal device in an exemplary embodiment of the invention.
Figure 6:
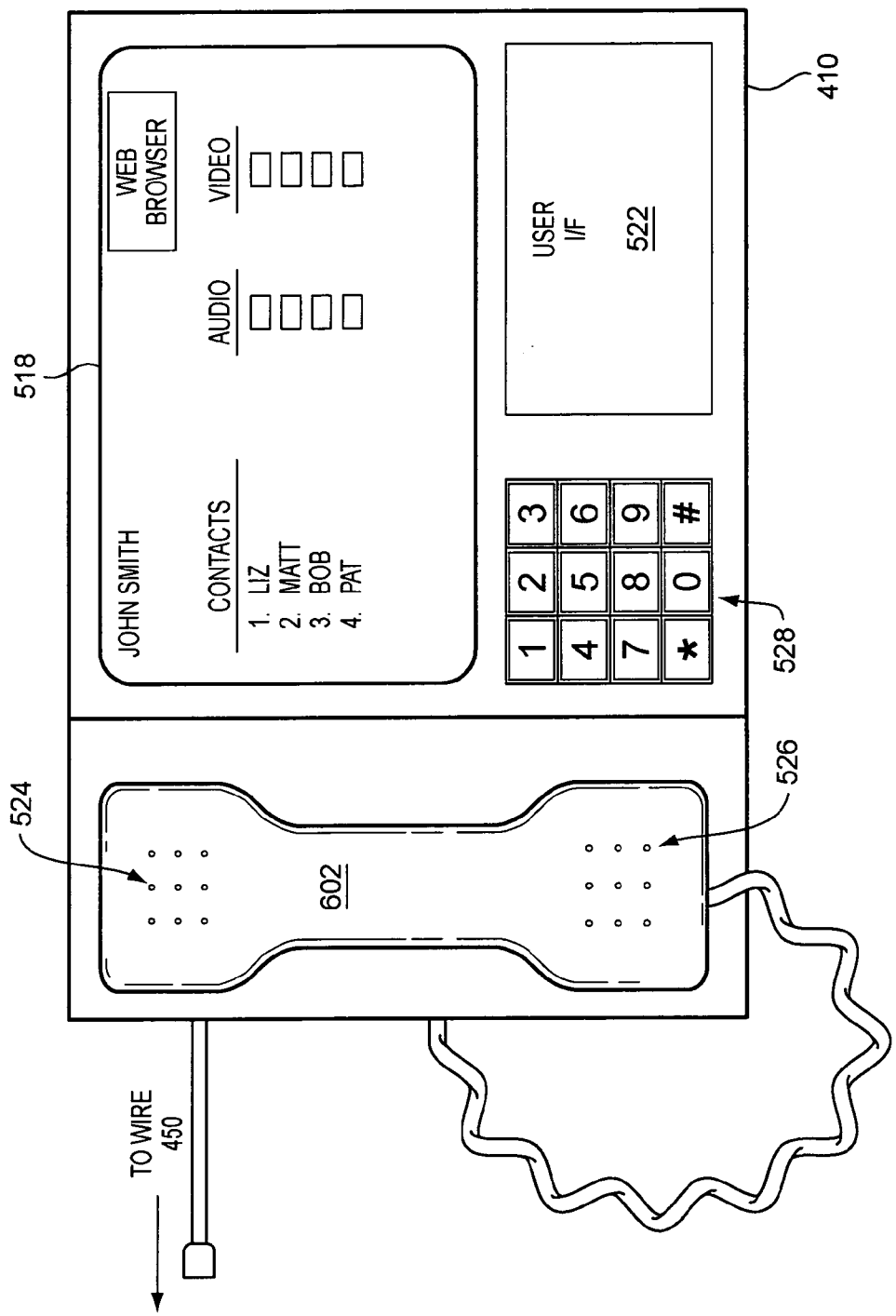
FIG. 6 illustrates the interfaces of a terminal device in an exemplary embodiment of the invention.

Terminal Device in a Communication Network—FIGS. 4–6

FIG. 4 illustrates a customer premises 402 coupled to a communication network 404 in an exemplary embodiment of the invention. Customer premises 402 includes a terminal device 410. Communication network 404 includes a central office 420, a Public Switched Telephone Network (PSTN) 422, an Internet Service Provider (ISP) 424, the Internet 426, a Voice over Internet Protocol (VoIP) server 428, and content servers 430. Central office 420 includes DSL system 440 and POTS system 442.

Customer premises 402 connects to central office 420 over a conventional twisted-pair copper wire 450. Central office 420 comprises the central office of a local telephone company. The connection between customer premises 402 and central office 420 represents the "last mile" to customer premises 402. Central office 420 connects to PSTN 422 and ISP 424. Central office 420 may connect to ISP 424 through PSTN 422 in some embodiments. ISP 424 connects to the Internet 426 and provides access to the Internet 426. Through the Internet 426, ISP 424 is able to connect to VoIP server 428 that provides VoIP service. ISP 424 is also able to connect to content servers 430, such as Yahoo!, Google, CNN, etc, through the Internet 426. ISP 424 may be able to connect to many other service and/or content providers.

Central office 420 provides POTS service over wire 450 through POTS system 442. POTS system 442 comprises conventional circuitry and systems used to provide POTS service, such as a switch, a power supply, etc. Central office 420 also provides DSL service over wire 450 through DSL system 440. DSL system 440 may include a Digital Subscriber Line Access Multiplexer (DSLAM) or other equipment. DSL system 442 may not be located in central office 420 in other embodiments, as central office 420 may contract with another company or provider for the DSL service.

FIG. 5 illustrates the components of terminal device 410 in an exemplary embodiment of the invention. Terminal device 410 includes a filter 502, a DSL modem 504, a modem 506, power detection circuitry 510, a power supply 512, a processing system 514, a wireless system 516, a display 518, Digital-to-Analog (D/A) circuitry 520, a user interface 522, a speaker 524, a microphone 526, a keypad 528, and POTS circuitry 530.

Filter 502 connects to wire 450. Filter 502 also connects to POTS circuitry 530 and DSL modem 504. POTS circuitry 530 connects to power detection circuitry 510, modem 506, speaker 524, microphone 526, and keypad 528. DSL modem 504 connects to processing system 514. Modem 506 connects to processing system 514. Processing system 514 connects to wireless system 516, display 518, user interface 522, and D/A circuitry 520. D/A circuitry 520 connects to speaker 524, microphone 526, and keypad 528. Power detection circuitry 510 connects to power supply 512. Power supply 512 connects to a commercial power supply 550 to provide power to terminal device 410.

Terminal device 410 is configured to provide voice and data services. Terminal device 410 receives POTS service from POTS system 442 over wire 450 for voice communications (see FIG. 4). Using the POTS service, terminal device 410 may receive and transmit voice calls. Terminal device 410 also receives DSL service from DSL system 440 over wire 450 for data communications (see FIG. 4). Using the DSL service, terminal device 410 may receive and transmit data.

In operation, filter 502 receives DSL signals over wire 450. DSL signals in this embodiment include analog POTS signals and digital signals. Filter 502 separates the analog POTS signals from the digital signals, forwards the analog POTS signals to POTS circuitry 530, and forwards the digital signals to DSL modem 504. The analog POTS signals transferred to POTS circuitry 530 represent traditional POTS service. The digital signals transferred to DSL modem 504 represent data services provided by the DSL service.

As a default for the POTS service, POTS circuitry 530 forwards the analog POTS signals to modem 506. Modem 506 receives the analog POTS signals and converts the analog POTS signals from analog format to digital format to generate digital POTS signals. Modem 506 transmits the digital POTS signals to processing system 514. Processing system 514 performs an application on the digital POTS signals to provide one or more presentation formats of the digital POTS signal to a user of terminal device 410.

Processing system 514 then forwards the digital POTS signals to D/A circuitry 520. D/A circuitry 520 converts the digital POTS signals again into analog POTS signals and transmits the analog POTS signals to speaker 524. Responsive to the analog POTS signals, speaker 524 emits audible signals to a user representing the analog POTS signals.

Digitizing the analog POTS signals may allow terminal device 410 to provide enhanced features to the user by providing multiple presentation formats of the digital POTS signals to the user. For instance, processing system 514 may generate text from the digital POTS signals and display the text to the user through display 518 or another data interface system. The user can then read what was said in a conversation as the text of the conversation is displayed to the user. Processing system 514 may also store part or all of the text of the conversation in a soft copy for future reference or print the text of the conversation in a hard copy. In storing or printing the text, understand that processing system 514 may generate appropriate store or print commands to peripheral devices.

Processing system 514 may perform any application that can be performed on digital signals or digital data to provide a useful or valuable feature to the user. For instance, processing system 514 may perform another application on the digital POTS signals to format the digital POTS signals for wireless communication. Processing system 514 may then transfers the digital POTS signals to wireless system 516. Wireless system 516 may comprise an 802.11b hub or an 802.11g hub used for wireless transmission. Wireless system 516 can then transmit the digital POTS signals to remote wireless devices (not shown). The remote wireless devices may be wireless phones, wireless computers, Personal Digital Assistants (PDA), etc.

The components used to digitize the analog POTS signals require power from power supply 512 to operate. For instance, modem 506, processing system 514, and D/A circuitry 520 need power from power supply 512. Therefore, power detection circuitry 510 monitors the power provided by power supply 512 and detects interrupts in the power. The interrupt in power may be due to a problem with power supply 512 or a problem or outage with commercial power supply 550. The interrupt in power may be a temporary interrupt of a few seconds, or may be an extended interrupt of hours or days.

If power detection circuitry 510 detects an interrupt in power, then POTS circuitry 530 no longer forwards the analog POTS signals to modem 506. Power detection circuitry 510 provides an instruction or control signal to POTS circuitry 530 indicating that the power has been interrupted. Responsive to the instruction from power detection circuitry 510 that power has been interrupted, POTS circuitry 530 handles the call. POTS circuitry 530 comprises conventional POTS circuitry used for POTS service. POTS circuitry 530 handles the analog POTS signals in a conventional manner and forwards the analog POTS signals to speaker 524. Responsive to the analog POTS signals, speaker 524 emits audible signals to a user representing the analog POTS signals.

Because POTS circuitry 530 is connected to the POTS service, POTS circuitry 530 receives a low voltage signal from central office 420 in FIG. 4. The low voltage signal powers POTS circuitry 530 instead of power supply 512. POTS circuitry 530 may not be able to provide the enhanced services as can be done by digitizing the analog POTS signals. However, POTS circuitry 530 is able to operate even if power is interrupted to terminal device 410 so that the user may still make and receive calls.

The user may also make a call using terminal device 410. The user enters a number using keypad 528. The user may also enter a number by selecting a number displayed on display 518, enter a number through user interface 522, etc. Depending on whether power has been interrupted to terminal device 410, terminal device 410 places the call through POTS circuitry 530 or processing system 514.

Terminal device 410 also provides high speed data service to the user through DSL service. For DSL service, DSL modem 504 receives the digital signals from filter 502. DSL modem 504 forwards the digital signals to processing system 514. Processing system 514 performs an application on the digital signals to provide additional data to the user. For instance, the digital signals may carry an HTML file for a web site. Processing system 514 may then display the web site to the user through display 518.

Terminal device 410 may also transmit data using the DSL service. The user may input data using user interface 522. The data may be inputted from a keyboard, a mouse or other pointing device, a keypad, or a touch-screen. Processing system 514 receives the input and processes the input. Processing system 514 may run one or more applications based on the input to generate digital signals. Processing system 514 forwards the digital signals to DSL modem 504. DSL modem 504 forwards the digital signals to filter 502.

The DSL service allows the user to surf the Internet, send and receive emails, etc. The DSL service advantageously provides a high speed connection to the Internet 426 through ISP 424 (see FIG. 4). The DSL service may also be used to further enhance a voice call to the user or to provide other features for the user. For instance, DSL service may allow terminal device 410 to receive and transmit Short Message Service (SMS) messages. The DSL service may also allow the user to download a telephone directory from the Internet 426.

The user may also make calls using the DSL service. If the user subscribes to VoIP service, then processing system 514 runs some type of VoIP software. The VoIP software allows the user to enter a phone number. The VoIP software uses the high speed DSL service to connect with VoIP server 428 through ISP 424 (see FIG. 4). VoIP server 428 locates a terminating node for the phone number and establishes an IP address for the terminating point for the call. VoIP server 428 transmits the IP address to the VoIP software running on processing system 514. With the call set up, the user may then talk into microphone 526. The VoIP software converts the user's voice captured by microphone 526 into digital signals. The VoIP software then transmits the digital signals over wire 450 at the high frequency of the DSL service. The VoIP software transmits the digital signals to the terminating point based on the IP address of the terminating point. The digital signals travel over the Internet 426 to the terminating point.

In this embodiment of the invention, DSL service is used. In other embodiments, other data services may be used in conjunction with the POTS service. For instance, terminal device 410 may include a cable modem in another embodiment to receive a cable data service in addition to the POTS service.

FIG. 6 illustrates the interfaces of terminal device 410 in an exemplary embodiment of the invention. Terminal device 410 includes a handset 602, display 518, user interface 522, and keypad 528. Handset 602 includes speaker 524 and microphone 526. Terminal device 410 may also include other features, such as a wireless antenna for 802.11b or 802.11g communications. This view of terminal device 410 is just one embodiment. Terminal device 410 may look more like a computer than a telephone in other embodiments. Speaker 524 and microphone 526 may not be included in handset 602 in other embodiments.

Terminal device 410 allows the user to make calls, surf the Internet, send and receive emails, etc. Assume the user wants to make a call. Display 518 displays a home calling page to the user. The home calling page is customized for the user. Terminal device 410 may store the home calling page, or terminal device 410 may download the home calling page from the Internet 426 (see FIG. 4). The home calling page includes a list of contacts frequently called by the user. The list may also include phone numbers, email addresses, and other information on the contacts. There may be many other contacts listed than those shown in FIG. 6. The contacts list may correspond with email software used in terminal device 410, such as Microsoft Outlook.

The user selects one of the contacts in the contact list. The user may select the contact using a mouse, a keyboard, a touch screen, etc. The user may select whether the call is an audio call or a video call. Responsive to selecting the contact, terminal device 410 places the call. Terminal device 410 may place the call using POTS service or VoIP service. The user may be unaware of the service used by terminal device 410.

The user may also enter a telephone number manually using keypad 528. Keypad 528 may be used to dial new numbers. Keypad 528 may also be used if power is interrupted to terminal device 410. As shown in FIG. 5, keypad 528, speaker 524, and microphone 526 are powered by the POTS service through POTS circuitry 530. Therefore, the user may use terminal device 410 when the power is interrupted.

When the call is connected, terminal device 410 may display a text version of the call on display 518. Terminal device 410 is able to provide the text version because it digitizes the analog POTS signals. The user may be able to store all or a portion of the text version of the call for future reference. The user may also print all or a portion of the text version.

Through DSL service, the user can surf the Internet 426 and make calls simultaneously. Assume that terminal device 410 is logged on to ISP 424 in FIG. 4. ISP 424 provides terminal device 410 access to the Internet 426. With the call connected, the user may select the "Web Browser" icon. The web browser may link to a search engine, such as Yahoo! or Google, or may link to another web site designated by the user. Through user interface 522 and display 518, the user may then surf the Internet 426.

Through the DSL service, the user may also receive other features of communication. In one example, the user may receive text messages that are displayed on display 518. The user may receive the Short Message Service (SMS) messages from cell phones or other wireless devices. The user may also transmit text messages through user interface 522. In another example, terminal device 518 may download a telephone directory from the Internet 426 to assist the user in placing a call.

Terminal device 410 advantageously combines voice services and data services to provide enhanced features for the user. Features from the data services may be used to enhance the voice services, and vice-versa, to give new and valuable options to the user.

We claim:

1. A communication device configured to connect to at least one wireline, the communication device comprising:

a POTS interface system configured to receive analog voice signals for a call from a POTS provider over the at least one wireline;

the POTS interface system, responsive to receiving the analog voice signals for the call, converts the analog voice signals received over the at least one wireline from analog format to digital format to generate digital voice signals, and forwards the digital voice signals;

a processing system, responsive to receiving the digital voice signals, performs an application on the digital voice signals to provide at least one presentation format of the digital voice signals of the call to a user;

a conversion system, responsive to receiving the digital voice signals, converts the digital voice signals into analog voice signals and forwards the analog voice signals;

a voice interface system, responsive to receiving the analog voice signals from the conversion system, transmits audible signals to the user representing the analog voice signals; and a digital interface system configured to receive digital data signals from a data service provider over the at least one wireline, and forward the digital data signals;

the processing system, responsive to receiving the digital data signals, performs an application on the digital data signals to provide additional data to the user.

2. The communication device of claim 1 wherein:

the digital voice signals of the call comprise bearer communications for the call; and the processing system, responsive to receiving the digital voice signals, performs the application on the digital voice signals to generate text of the bearer communications for the call and display the text to the user through a data interface system.

3. The communication device of claim 1 wherein:

the processing system, responsive to receiving the digital voice signals, performs another application on the digital voice signals to format the digital voice signals for transmission to remote wireless devices.

4. The communication device of claim 1 wherein:

the processing system, responsive to receiving the digital data signals, performs the application on the digital data signals to display a telephone directory to the user.

5. The communication device of claim 1 wherein:

the processing system, responsive to receiving the digital data signals, performs the application on the digital data signals to display caller identification information for the call to the user.

6. The communication device of claim 1 wherein:

the processing system, responsive to receiving the digital data signals, performs the application on the digital data signals to display a web page to the user.

7. The communication device of claim 1 wherein:

the processing system, responsive to receiving the digital data signals, performs the application on the digital data signals to display a text message to the user.

8. The communication device of claim 1 wherein:

the processing system, responsive to receiving the digital data signals, performs another application on the digital data signals to provide digital telephone service to the user.

9. The communication device of claim 1 wherein:

the processing system, responsive to receiving the digital voice signals, performs the application on the digital voice signals to provide voice for the call to the user; and the processing system, responsive to receiving the digital data signals, performs the application on the digital data signals to provide video for the call to the user.

10. The communication device of claim 1 wherein the communication device further comprises:

a power supply system that provides power to the communication device;

power detection system that detects an interrupt in the power provided by the power supply system; and POTS circuitry configured to receive the analog voice signals and transfer the analog voice signals to the POTS interface system, the POTS circuitry, responsive to the power detection system detecting an interrupt in power, transmits the analog voice signals to the voice interface system instead of the POTS interface system.

11. A method of operating a communication device configured to connect to at least one wireline, the method comprising the steps of:

receiving analog voice signals for a call from a POTS provider over the at least one wireline, converting the analog voice signals received over the at least one wireline from analog format to digital format to generate digital voice signals, performing an application on the digital voice signals to provide at least one presentation format of the digital voice signals of the call to a user, converting the digital voice signals into analog voice signals, transmitting audible signals to the user representing the analog voice signals, receiving digital data signals from a data service provider over the at least one wireline, and performing an application on the digital data signals to provide additional data to the user.

12. The method of claim 11 wherein the digital voice signals of the call comprise bearer communications for the call, and wherein the step of performing an application on the digital voice signals to provide at least one presentation format of the digital voice signals to a user comprises:

generating text of the bearer communications for the call; and displaying the text to the user.

13. The method of claim 11 further comprising the step of:

performing another application on the digital voice signals to format the digital voice signals for transmission to remote wireless devices.

14. The method of claim 11 wherein the step of performing an application on the digital data signals to provide additional data to the user comprises:

displaying a telephone directory to the user.

15. The method of claim 11 wherein the step of performing an application on the digital data signals to provide additional data to the user comprises:

displaying caller identification information to the user.

16. The method of claim 11 wherein the step of performing an application on the digital data signals to provide additional data to the user comprises:

displaying a web page to the user.

17. The method of claim 11 wherein the step of performing an application on the digital data signals to provide additional data to the user comprises:

displaying a text message to the user.

18. The method of claim 11 further comprising the step of:

performing another application on the digital data signals to provide digital telephone service to the user.

19. The method of claim 11 further comprising the steps of:

performing the application on the digital voice signals to provide voice for the call to the user; and performing the application on the digital data signals to provide video for the call to the user.

20. The method of claim 11 further comprising:

detecting an interrupt in the power provided to the communication device, and converting the analog voice signals from analog format to digital format to generate digital voice signals responsive to not detecting an interrupt in the power, and not converting the analog voice signals from analog format to digital format responsive to detecting an interrupt in the power.

* * * * *